(12) United States Patent
Golla

(10) Patent No.: US 9,690,625 B2
(45) Date of Patent: Jun. 27, 2017

(54) SYSTEM AND METHOD FOR OUT-OF-ORDER RESOURCE ALLOCATION AND DEALLOCATION IN A THREADED MACHINE

(75) Inventor: Robert T. Golla, Round Rock, TX (US)

(73) Assignee: Oracle America, Inc., Redwood City, CA (US)

( * ) Notice: Subject to any disclaimer, the term of this patent is extended or adjusted under 35 U.S.C. 154(b) by 990 days.

(21) Appl. No.: 12/485,608

(22) Filed: Jun. 16, 2009

(65) Prior Publication Data
US 2010/0318998 A1 Dec. 16, 2010

(51) Int. Cl.
*G06F 9/46* (2006.01)
*G06F 9/50* (2006.01)

(52) U.S. Cl.
CPC ...... *G06F 9/5011* (2013.01); *G06F 2209/507* (2013.01)

(58) Field of Classification Search
CPC ........ G06F 9/50; G06F 9/5005; G06F 9/5027; G06F 9/5011; G06F 2209/507
USPC ........................................................ 718/104
See application file for complete search history.

(56) References Cited

U.S. PATENT DOCUMENTS

| | | |
|---|---|---|
| 5,367,678 A | 11/1994 | Lee et al. |
| 5,809,268 A | 9/1998 | Chan |
| 5,809,329 A * | 9/1998 | Lichtman et al. ................. 710/8 |
| 6,073,159 A * | 6/2000 | Emer .................... G06F 9/3861 |
| | | 712/E9.053 |
| 6,092,181 A * | 7/2000 | Nguyen .............. G06F 9/30061 |
| | | 712/206 |
| 6,574,725 B1 * | 6/2003 | Kranich .............. G06F 9/30087 |
| | | 709/208 |
| 6,598,068 B1 | 7/2003 | Clark |

(Continued)

FOREIGN PATENT DOCUMENTS

WO WO 2008/155834 * 12/2008

OTHER PUBLICATIONS

John Beidler; Data Structure and Algorithms; Springer 1997; pp. 28-30.*

(Continued)

*Primary Examiner* — James J Lee
(74) *Attorney, Agent, or Firm* — Robert C. Kowert; Meyertons, Hood, Kivlin, Kowert & Goetzel, P.C.

(57) ABSTRACT

A system and method for managing the dynamic sharing of processor resources between threads in a multi-threaded processor are disclosed. Out-of-order allocation and deallocation may be employed to efficiently use the various resources of the processor. Each element of an allocate vector may indicate whether a corresponding resource is available for allocation. A search of the allocate vector may be performed to identify resources available for allocation. Upon allocation of a resource, a thread identifier associated with the thread to which the resource is allocated may be associated with the allocate vector entry corresponding to the allocated resource. Multiple instances of a particular resource type may be allocated or deallocated in a single processor execution cycle. Each element of a deallocate vector may indicate whether a corresponding resource is ready for deallocation. Examples of resources that may be dynamically shared between threads are reorder buffers, load buffers and store buffers.

19 Claims, 7 Drawing Sheets

(56) References Cited

U.S. PATENT DOCUMENTS

| | | | |
|---|---|---|---|
| 6,738,974 B1* | 5/2004 | Nageswaran et al. | 718/104 |
| 7,107,433 B1* | 9/2006 | Nguyen | 712/217 |
| 7,310,722 B2* | 12/2007 | Moy et al. | 712/207 |
| 7,565,656 B2* | 7/2009 | Yamasaki et al. | 718/104 |
| 2003/0005266 A1* | 1/2003 | Akkary et al. | 712/220 |
| 2004/0148493 A1* | 7/2004 | Chu et al. | 712/214 |
| 2004/0190526 A1* | 9/2004 | Kumar et al. | 370/395.21 |
| 2004/0215936 A1* | 10/2004 | Ambekar et al. | 712/217 |
| 2006/0004989 A1* | 1/2006 | Golla | 712/214 |
| 2008/0016321 A1* | 1/2008 | Pennock et al. | 712/35 |
| 2008/0016326 A1* | 1/2008 | Svendsen et al. | 712/217 |
| 2009/0049446 A1* | 2/2009 | Merten | G06F 9/3851 718/103 |
| 2010/0100708 A1* | 4/2010 | Ukai | 712/205 |

OTHER PUBLICATIONS

Magumi Yokoi; Translation of Publication WO 2008/155834 published on Dec. 24, 2008.*

\* cited by examiner

SYSTEM AND METHOD FOR OUT-OF-ORDER RESOURCE ALLOCATION AND DEALLOCATION IN A THREADED MACHINE

BACKGROUND OF THE INVENTION

Field of the Invention

This invention relates to multi-threaded processors and, more specifically, to dynamic sharing of processor resources between multiple processor threads.

Description of the Related Art

Modern computer processors typically include cores that simultaneously execute multiple threads. Each thread may include a set of instructions that execute independently of instructions from another thread. For example, an individual software process, such as an application, may consist of one or more threads that may be scheduled for execution by an operating system. Multi-threaded cores may lead to more efficient use of processor resources and improved processor performance, as resources are less likely to sit idle with multiple threads operating in different stages of execution.

Processor performance in a multi-threaded system can be further improved with dynamic sharing of processor resources between the multiple threads. Resources that are dynamically shared, as opposed to statically shared, are provided to system threads on an as needed basis and released by system threads as soon as the resources are no longer needed. Examples of resources that may be shared dynamically between threads include branch buffers, load and store buffers, pick queue entries, translation buffer miss entries and retirement buffers.

SUMMARY

Various embodiments of a method and system for out-of-order resource allocation and deallocation within a multi-threaded system are disclosed. Out-of-order allocation of resources may occur when a set of similar resources are allocated to multiple system threads over a period of several execution cycles. For example, in some embodiments, the system threads may be operating at various stages of execution, such that allocation of resources to each thread may not occur in a sequential manner with request to other threads. In some embodiments, out-of-order deallocation of resources may occur when the resources are deallocated in an order that is different from the order in which the resources were originally allocated. For example, system threads operating at various stages of execution may deallocate resources at different intervals, resulting in out-of-order deallocation. In another example, a thread-specific flush may result in deallocation of all resources associated with the thread, such that resources are deallocated in an order different from the order in which they were originally allocated. Examples of resources that may be allocated and deallocated within a multi-threaded system are entries of a reorder buffer, load buffer, store buffer, and pick queue.

In some embodiments, allocating a resource to a system thread may include updating a data structure to indicate that the resource has been allocated to the system thread. For example, the data structure may include a number of elements equal to the maximum number of available resources of a particular resource type, with each element of the data structure representing one instance of a resource. In some embodiments, each element representing a resource instance may be updated to indicate whether the resource is available for allocation. In some embodiments, a thread identifier representing the thread to which a resource is allocated may be associated with the data structure element representing the resource. The thread identifier may be used to identify for deallocation all resources associated with a particular thread, such as during a thread specific flush, as described above.

Locating a resource available for allocation may involve searching the data structure representing a particular resource type, in some embodiments. The data structure may be searched during each execution cycle, with an indication of available resources stored for future use by an upcoming instruction. In some embodiments, this approach may decrease latency times, as instructions may not be delayed while waiting for available resources to be located. In various embodiments, different search algorithms may be used to locate available resources. For example, a single left-to-right search through the data structure may return a result indicating the next resource available for allocation. In another example, a faster search result may be returned if multiple searches are performed concurrently within a resource allocate vector. Such multiple searches may be performed in the same or opposite directions within the data structure and the search result may return one or multiple resources available for allocation, in different embodiments.

In some embodiments, multiple resources may be deallocated in single execution cycle. For example, in the case of a thread-specific flush, as described above, all resources allocated to a given thread may be released by the thread within a single execution cycle. In some embodiments, a deallocate vector may be used to support deallocation of multiple resources in a single cycle. For example, a deallocate vector may be used as a mask, with each entry in the deallocate vector indicating whether the corresponding entry in the resource data structure should be deallocated.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Overview of Multithreaded Processor Architecture

Figure 1:
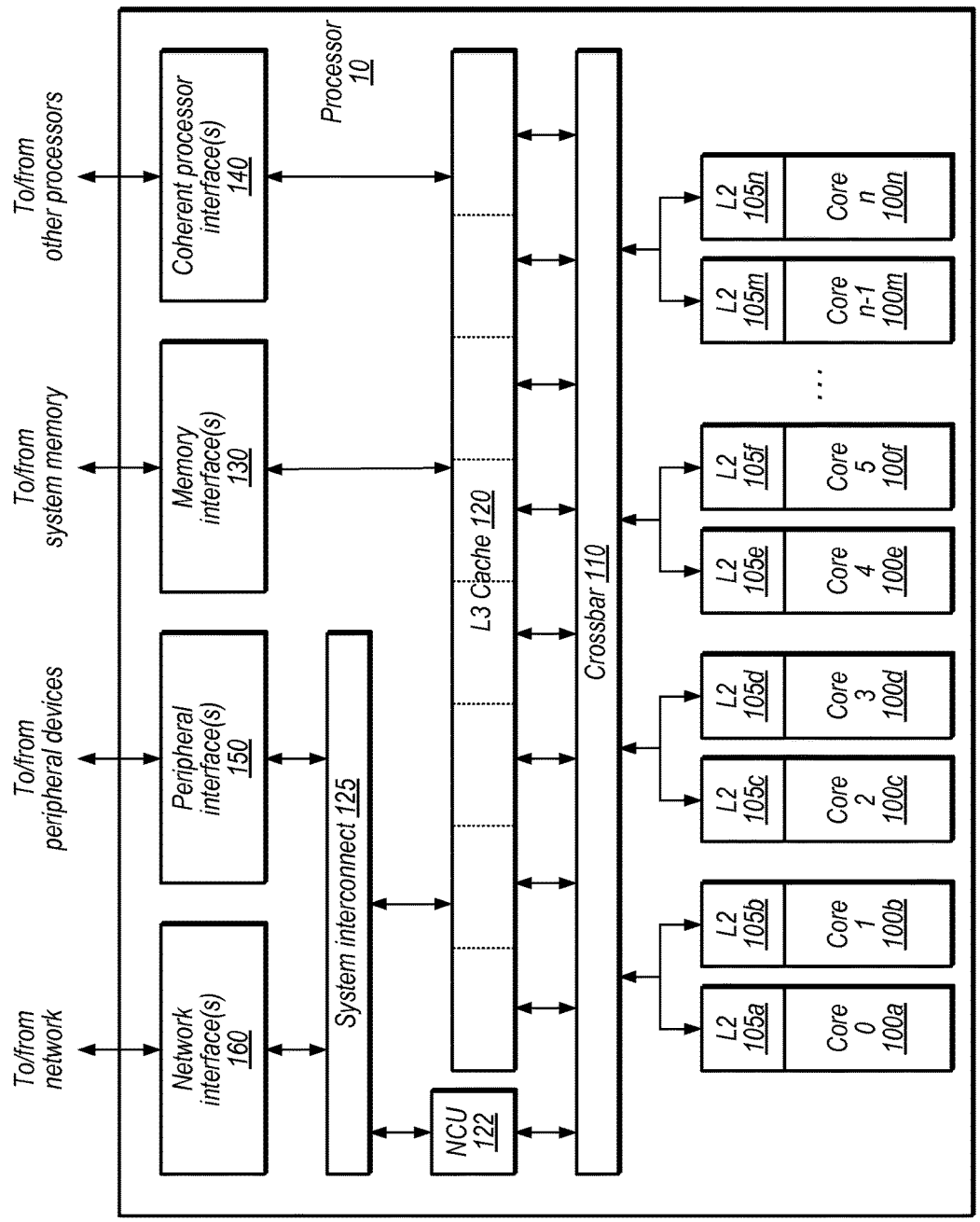
FIG. 1 is a block diagram illustrating one embodiment of a multithreaded processor.

A block diagram illustrating one embodiment of a multithreaded processor 10 is shown in FIG. 1. In the illustrated embodiment, processor 10 includes a number of processor cores 100a-n, which are also designated "core 0" though "core n." Various embodiments of processor 10 may include varying numbers of cores 100, such as 8, 16, or any other suitable number. Each of cores 100 is coupled to a corresponding L2 cache 105a-n, which in turn couple to L3 cache 120 via a crossbar 110. Cores 100a-n and L2 caches 105a-n may be generically referred to, either collectively or individually, as core(s) 100 and L2 cache(s) 105, respectively.

Via crossbar 110 and L3 cache 120, cores 100 may be coupled to a variety of devices that may be located externally to processor 10. In the illustrated embodiment, one or more memory interface(s) 130 may be configured to couple to one or more banks of system memory (not shown). One or more coherent processor interface(s) 140 may be configured to couple processor 10 to other processors (e.g., in a multiprocessor environment employing multiple units of processor 10). Additionally, system interconnect 125 couples cores 100 to one or more peripheral interface(s) 150 and network interface(s) 160. As described in greater detail below, these interfaces may be configured to couple processor 10 to various peripheral devices and networks.

Cores 100 may be configured to execute instructions and to process data according to a particular instruction set architecture (ISA). In some embodiments, cores 100 may be configured to implement a version of the SPARC® ISA, such as SPARC® V9, UltraSPARC Architecture 2005, UltraSPARC Architecture 2007, or UltraSPARC Architecture 2009, for example. However, in other embodiments it is contemplated that any desired ISA may be employed, such as x86 (32-bit or 64-bit versions), PowerPC® or MIPS®, for example.

In the illustrated embodiment, each of cores 100 may be configured to operate independently of the others, such that all cores 100 may execute in parallel. Additionally, as described below in conjunction with the description of FIG. 2, in some embodiments, each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In some embodiments, each of cores 100 may be configured to concurrently execute instructions from a variable number of threads, up to eight concurrently-executing threads. In a 16-core implementation, processor 10 could thus concurrently execute up to 128 threads. However, in other embodiments it is contemplated that other numbers of cores 100 may be provided, and that cores 100 may concurrently process different numbers of threads.

Additionally, as described in greater detail below, in some embodiments, each of cores 100 may be configured to execute certain instructions out of program order, which may also be referred to herein as out-of-order execution, or simply OOO. As an example of out-of-order execution, for a particular thread, there may be instructions that are subsequent in program order to a given instruction yet do not depend on the given instruction. If execution of the given instruction is delayed for some reason (e.g., owing to a cache miss), the later instructions may execute before the given instruction completes, which may improve overall performance of the executing thread.

As shown in FIG. 1, in some embodiments, each core 100 may have a dedicated corresponding L2 cache 105. In some embodiments, L2 cache 105 may be configured as a set-associative, writeback cache that is fully inclusive of first-level cache state (e.g., instruction and data caches within core 100). To maintain coherence with first-level caches, embodiments of L2 cache 105 may implement a reverse directory that maintains a virtual copy of the first-level cache tags. L2 cache 105 may implement a coherence protocol (e.g., the MESI protocol) to maintain coherence with other caches within processor 10. In some embodiments, L2 cache 105 may enforce a Total Store Ordering (TSO) model of execution in which all store instructions from the same thread must complete in program order.

In various embodiments, L2 cache 105 may include a variety of structures configured to support cache functionality and performance. For example, L2 cache 105 may include a miss buffer configured to store requests that miss the L2, a fill buffer configured to temporarily store data returning from L3 cache 120, a writeback buffer configured to temporarily store dirty evicted data and snoop copyback data, and/or a snoop buffer configured to store snoop requests received from L3 cache 120. In some embodiments, L2 cache 105 may implement a history-based prefetcher that may attempt to analyze L2 miss behavior and correspondingly generate prefetch requests to L3 cache 120.

Crossbar 110 may be configured to manage data flow between L2 caches 105 and the shared L3 cache 120. In some embodiments, crossbar 110 may include logic (such as multiplexers or a switch fabric, for example) that allows any L2 cache 105 to access any bank of L3 cache 120, and that conversely allows data to be returned from any L3 bank to any L2 cache 105. That is, crossbar 110 may be configured as an M-to-N crossbar that allows for generalized point-to-point communication. However, in other embodiments, other interconnection schemes may be employed between L2 caches 105 and L3 cache 120. For example, a mesh, ring, or other suitable topology may be utilized.

Crossbar 110 may be configured to concurrently process data requests from L2 caches 105 to L3 cache 120 as well as data responses from L3 cache 120 to L2 caches 105. In some embodiments, crossbar 110 may include logic to queue data requests and/or responses, such that requests and responses may not block other activity while waiting for service. Additionally, in some embodiments crossbar 110 may be configured to arbitrate conflicts that may occur when multiple L2 caches 105 attempt to access a single bank of L3 cache 120, or vice versa.

L3 cache 120 may be configured to cache instructions and data for use by cores 100. In the illustrated embodiment, L3 cache 120 may be organized into eight separately addressable banks that may each be independently accessed, such that in the absence of conflicts, each bank may concurrently return data to a respective L2 cache 105. In some embodiments, each individual bank may be implemented using set-associative or direct-mapped techniques. For example, in some embodiments, L3 cache 120 may be an 8 megabyte (MB) cache, where each 1 MB bank is 16-way set associative with a 64-byte line size. L3 cache 120 may be implemented in some embodiments as a writeback cache in which written (dirty) data may not be written to system memory until a corresponding cache line is evicted. However, it is contemplated that in other embodiments, L3 cache 120 may be configured in any suitable fashion. For example, L3 cache 120 may be implemented with more or fewer banks, or in a scheme that does not employ independently-accessible banks; it may employ other bank sizes or cache geometries (e.g., different line sizes or degrees of set associativity); it may employ write-through instead of writeback behavior; and it may or may not allocate on a write miss. Other variations of L3 cache 120 configuration are possible and contemplated.

In some embodiments, L3 cache 120 may implement queues for requests arriving from and results to be sent to crossbar 110. Additionally, in some embodiments L3 cache 120 may implement a fill buffer configured to store fill data arriving from memory interface 130, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 120 may variously be implemented as single-ported or multiported (i.e., capable of processing multiple concurrent read and/or write accesses). In either case, L3 cache 120 may implement arbitration logic to prioritize cache access among various cache read and write requesters.

Not all external accesses from cores 100 necessarily proceed through L3 cache 120. In the illustrated embodiment, non-cacheable unit (NCU) 122 may be configured to process requests from cores 100 for non-cacheable data, such as data from I/O devices as described below with respect to peripheral interface(s) 150 and network interface(s) 160.

Memory interface 130 may be configured to manage the transfer of data between L3 cache 120 and system memory, for example in response to cache fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2, 3, or 4 Synchronous Dynamic Random Access Memory (DDR/DDR2/DDR3/DDR4 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. System interconnect 125 may be configured to provide a central interface for such sources to exchange data with cores 100, L2 caches 105, and/or L3 cache 120. In some embodiments, system interconnect 125 may be configured to coordinate Direct Memory Access (DMA) transfers of data to and from system memory. For example, via memory interface 130, system interconnect 125 may coordinate DMA transfers between system memory and a network device attached via network interface 160, or between system memory and a peripheral device attached via peripheral interface 150.

Processor 10 may be configured for use in a multiprocessor environment with other instances of processor 10 or other compatible processors. In the illustrated embodiment, coherent processor interface(s) 140 may be configured to implement high-bandwidth, direct chip-to-chip communication between different processors in a manner that preserves memory coherence among the various processors (e.g., according to a coherence protocol that governs memory transactions).

Peripheral interface 150 may be configured to coordinate data transfer between processor 10 and one or more peripheral devices. Such peripheral devices may include, for example and without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In some embodiments, peripheral interface 150 may implement one or more instances of a standard peripheral interface. For example, some embodiments of peripheral interface 150 may implement the Peripheral Component Interface Express (PCI Express™ or PCIe) standard according to generation 1.x, 2.0, 3.0, or another suitable variant of that standard, with any suitable number of I/O lanes. However, it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more network devices (e.g., networked computer systems or peripherals) coupled to processor 10 via a network. In some embodiments, network interface 160 may be configured to perform the data processing necessary to implement an Ethernet (IEEE 802.3) networking standard such as Gigabit Ethernet or 10-Gigabit Ethernet, for example. However, it is contemplated that any suitable networking standard may be implemented, including forthcoming standards such as 40-Gigabit Ethernet and 100-Gigabit Ethernet. In some embodiments, network interface 160 may be configured to implement other types of networking protocols, such as Fibre Channel, Fibre Channel over Ethernet (FCoE), Data Center Ethernet, Infiniband, and/or other suitable networking protocols. In some embodiments, network interface 160 may be configured to implement multiple discrete network interface ports.

Overview of Dynamic Multithreading Processor Core

As mentioned above, in some embodiments each of cores 100 may be configured for multithreaded, out-of-order execution. More specifically, in some embodiments, each of cores 100 may be configured to perform dynamic multithreading. Generally speaking, under dynamic multithreading, the execution resources of cores 100 may be configured to efficiently process varying types of computational workloads that exhibit different performance characteristics and resource requirements. Such workloads may vary across a continuum that emphasizes different combinations of individual-thread and multiple-thread performance.

At one end of the continuum, a computational workload may include a number of independent tasks, where completing the aggregate set of tasks within certain performance criteria (e.g., an overall number of tasks per second) is a more significant factor in system performance than the rate at which any particular task is completed. For example, in certain types of server or transaction processing environments, there may be a high volume of individual client or customer requests (such as web page requests or file system accesses). In this context, individual requests may not be particularly sensitive to processor performance. For example, requests may be I/O-bound rather than processor-bound-completion of an individual request may require I/O accesses (e.g., to relatively slow memory, network, or storage devices) that dominate the overall time required to complete the request, relative to the processor effort involved. Thus, a processor that is capable of concurrently processing many such tasks (e.g., as independently executing threads) may exhibit better performance on such a workload than a processor that emphasizes the performance of only one or a small number of concurrent tasks.

At the other end of the continuum, a computational workload may include individual tasks whose performance is highly processor-sensitive. For example, a task that involves significant mathematical analysis and/or transformation (e.g., cryptography, graphics processing, scientific computing) may be more processor-bound than I/O-bound. Such tasks may benefit from processors that emphasize single-task performance, for example through speculative execution and exploitation of instruction-level parallelism.

Dynamic multithreading represents an attempt to allocate processor resources in a manner that flexibly adapts to workloads that vary along the continuum described above. In some embodiments, cores 100 may be configured to implement fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle. Through the use of fine-grained multithreading, cores 100 may be configured to efficiently process workloads that depend more on concurrent thread processing than individual thread performance.

In some embodiments, cores 100 may also be configured to implement out-of-order processing, speculative execution, register renaming and/or other features that improve the performance of processor-dependent workloads. Moreover, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing, while retaining the flexibility to support workloads that exhibit a greater number of threads that are less processor-dependent in their performance. In various embodiments, the resources of a given core 100 that may be dynamically allocated among a varying number of threads may include branch resources (e.g., branch predictor structures), load/store resources (e.g., load/store buffers and queues), instruction completion resources (e.g., reorder buffer structures and commit logic), instruction issue resources (e.g., instruction selection and scheduling structures), register rename resources (e.g., register mapping tables), and/or memory management unit resources (e.g., translation lookaside buffers, page walk resources).

Figure 2:
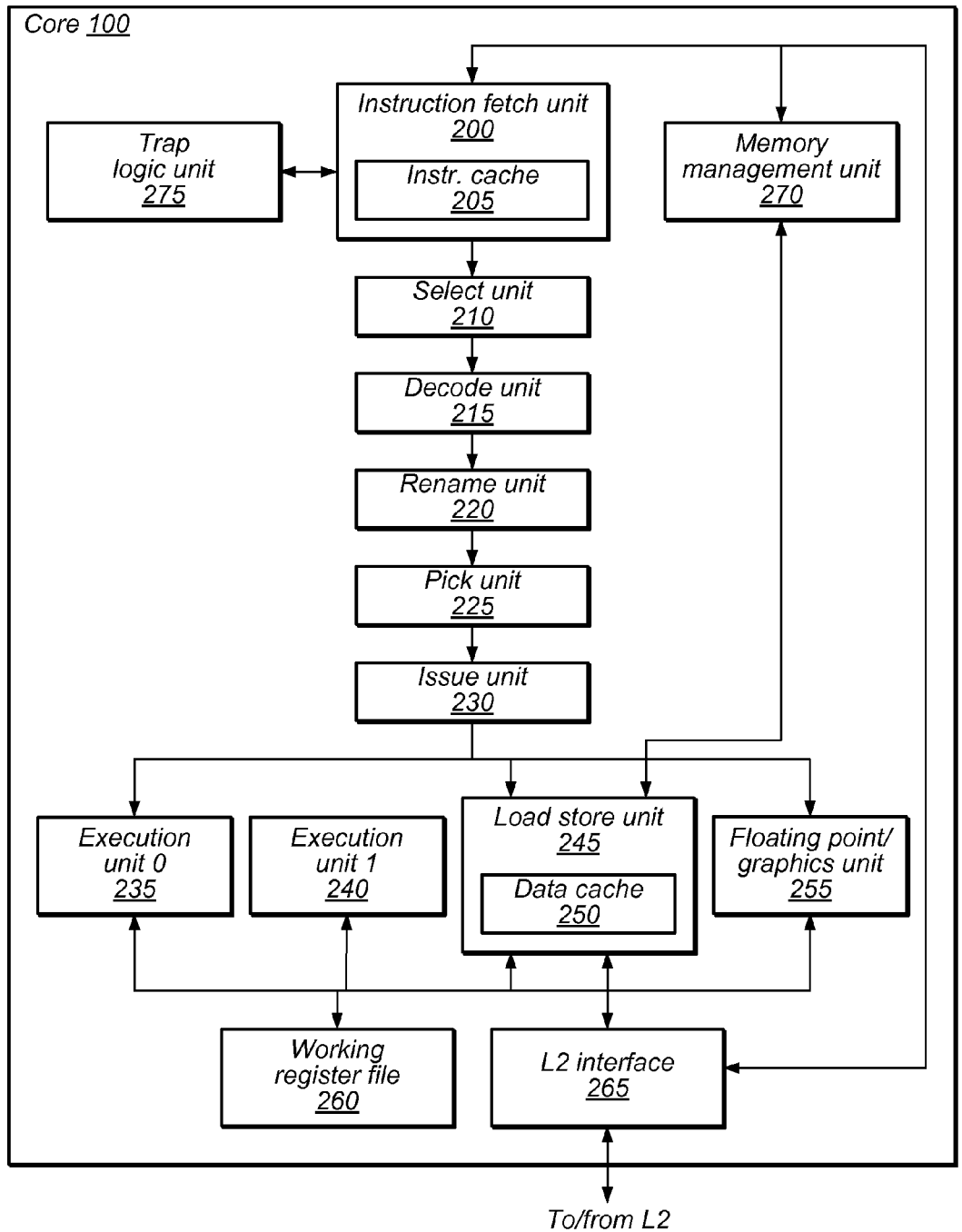
FIG. 2 is a block diagram illustrating one embodiment of a processor core configured to perform fine-grained multithreading.

One embodiment of core 100 that is configured to perform dynamic multithreading is illustrated in FIG. 2. In the illustrated embodiment, core 100 includes an instruction fetch unit (IFU) 200 that includes an instruction cache 205. IFU 200 is coupled to a memory management unit (MMU) 270, L2 interface 265, and trap logic unit (TLU) 275. IFU 200 is additionally coupled to an instruction processing pipeline that begins with a select unit 210 and proceeds in turn through a decode unit 215, a rename unit 220, a pick unit 225, and an issue unit 230. Issue unit 230 is coupled to issue instructions to any of a number of instruction execution resources: an execution unit 0 (EXU0) 235, an execution unit 1 (EXU1) 240, a load store unit (LSU) 245 that includes a data cache 250, and/or a floating point/graphics unit (FGU) 255. These instruction execution resources are coupled to a working register file 260. Additionally, LSU 245 is coupled to L2 interface 265 and MMU 270.

In the following discussion, various embodiments of each of the structures of the illustrated embodiment of core 100 are described. However, it is noted that the illustrated partitioning of resources is merely one example of how core 100 may be implemented. Alternative configurations and variations are possible and contemplated.

Instruction fetch unit 200 may be configured to provide instructions to the rest of core 100 for execution. In some embodiments, IFU 200 may be configured to select a thread to be fetched, fetch instructions from instruction cache 205 for the selected thread and buffer them for downstream processing, request data from L2 cache 105 in response to instruction cache misses, and predict the direction and target of control transfer instructions (e.g., branches). In some embodiments, IFU 200 may include a number of data structures in addition to instruction cache 205, such as an instruction translation lookaside buffer (ITLB), instruction buffers, and/or structures configured to store state that is relevant to thread selection and processing.

In some embodiments, during each execution cycle of core 100, IFU 200 may be configured to select one thread that will enter the IFU processing pipeline. Thread selection may take into account a variety of factors and conditions, some thread-specific and others IFU-specific. For example, certain instruction cache activities (e.g., cache fill), ITLB activities, or diagnostic activities may inhibit thread selection if these activities are occurring during a given execution cycle. Additionally, individual threads may be in specific states of readiness that affect their eligibility for selection. For example, a thread for which there is an outstanding instruction cache miss may not be eligible for selection until the miss is resolved. In some embodiments, those threads that are eligible to participate in thread selection may be divided into groups by priority, for example depending on the state of the thread or of the ability of the IFU pipeline to process the thread. In such embodiments, multiple levels of arbitration may be employed to perform thread selection: selection occurs first by group priority, and then within the selected group according to a suitable arbitration algorithm (e.g., a least-recently-fetched algorithm). However, it is noted that any suitable scheme for thread selection may be employed, including arbitration schemes that are more complex or simpler than those mentioned here.

Once a thread has been selected for fetching by IFU 200, instructions may actually be fetched for the selected thread. To perform the fetch, in some embodiments, IFU 200 may be configured to generate a fetch address to be supplied to instruction cache 205. In various embodiments, the fetch address may be generated as a function of a program counter associated with the selected thread, a predicted branch target address, or an address supplied in some other manner (e.g., through a test or diagnostic mode). The generated fetch address may then be applied to instruction cache 205 to determine whether there is a cache hit.

In some embodiments, accessing instruction cache 205 may include performing fetch address translation (e.g., in the case of a physically indexed and/or tagged cache), accessing a cache tag array, and comparing a retrieved cache tag to a requested tag to determine cache hit status. If there is a cache hit, IFU 200 may store the retrieved instructions within buffers for use by later stages of the instruction pipeline. If there is a cache miss, IFU 200 may coordinate retrieval of the missing cache data from L2 cache 105. In some embodiments, IFU 200 may also be configured to prefetch instructions into instruction cache 205 before the instructions are actually required to be fetched. For example, in the case of a cache miss, IFU 200 may be configured to retrieve the missing data for the requested fetch address as well as addresses that sequentially follow the requested fetch address, on the assumption that the following addresses are likely to be fetched in the near future.

In many ISAs, instruction execution proceeds sequentially according to instruction addresses (e.g., as reflected by one or more program counters). However, control transfer instructions (CTIs) such as branches, call/return instructions, or other types of instructions may cause the transfer of execution from a current fetch address to a nonsequential address. As mentioned above, IFU 200 may be configured to predict the direction and target of CTIs (or, in some embodiments, a subset of the CTIs that are defined for an ISA) in order to reduce the delays incurred by waiting until the effect of a CTI is known with certainty. In some embodiments, IFU 200 may be configured to implement a perceptron-based dynamic branch predictor, although any suitable type of branch predictor may be employed.

To implement branch prediction, IFU 200 may implement a variety of control and data structures in various embodiments, such as history registers that track prior branch history, weight tables that reflect relative weights or strengths of predictions, and/or target data structures that store fetch addresses that are predicted to be targets of a CTI. Also, in some embodiments, IFU 200 may further be configured to partially decode (or predecode) fetched instructions in order to facilitate branch prediction. A predicted fetch address for a given thread may be used as the fetch address when the given thread is selected for fetching by IFU 200. The outcome of the prediction may be validated when the CTI is actually executed (e.g., if the CTI is a conditional instruction, or if the CTI itself is in the path of another predicted CTI). If the prediction was incorrect, instructions along the predicted path that were fetched and issued may be cancelled.

Through the operations discussed above, IFU 200 may be configured to fetch and maintain a buffered pool of instructions from one or multiple threads, to be fed into the remainder of the instruction pipeline for execution. Generally speaking, select unit 210 may be configured to select and schedule threads for execution. In some embodiments, during any given execution cycle of core 100, select unit 210 may be configured to select up to one ready thread out of the maximum number of threads concurrently supported by core 100 (e.g., 8 threads), and may select up to two instructions from the selected thread for decoding by decode unit 215, although in other embodiments, a differing number of threads and instructions may be selected. In various embodiments, different conditions may affect whether a thread is ready for selection by select unit 210, such as branch mispredictions, unavailable instructions, or other conditions. To ensure fairness in thread selection, some embodiments of select unit 210 may employ arbitration among ready threads (e.g. a least-recently-used algorithm).

The particular instructions that are selected for decode by select unit 210 may be subject to the decode restrictions of decode unit 215; thus, in any given cycle, fewer than the maximum possible number of instructions may be selected. Additionally, in some embodiments, select unit 210 may be configured to allocate certain execution resources of core 100 to the selected instructions, so that the allocated resources will not be used for the benefit of another instruction until they are released. For example, select unit 210 may allocate resource tags for entries of a reorder buffer, load/store buffers, or other downstream resources that may be utilized during instruction execution.

Generally, decode unit 215 may be configured to prepare the instructions selected by select unit 210 for further processing. Decode unit 215 may be configured to identify the particular nature of an instruction (e.g., as specified by its opcode) and to determine the source and sink (i.e., destination) registers encoded in an instruction, if any. In some embodiments, decode unit 215 may be configured to detect certain dependencies among instructions, to remap architectural registers to a flat register space, and/or to convert certain complex instructions to two or more simpler instructions for execution. Additionally, in some embodiments, decode unit 215 may be configured to assign instructions to slots for subsequent scheduling. In some embodiments, two slots 0-1 may be defined, where slot 0 includes instructions executable in load/store unit 245 or execution units 235-240, and where slot 1 includes instructions executable in execution units 235-240, floating point/graphics unit 255, and any branch instructions. However, in other embodiments, other numbers of slots and types of slot assignments may be employed, or slots may be omitted entirely.

Register renaming may facilitate the elimination of certain dependencies between instructions (e.g., write-after-read or "false" dependencies), which may in turn prevent unnecessary serialization of instruction execution. In some embodiments, rename unit 220 may be configured to rename the logical (i.e., architected) destination registers specified by instructions by mapping them to a physical register space, resolving false dependencies in the process. In some embodiments, rename unit 220 may maintain mapping tables that reflect the relationship between logical registers and the physical registers to which they are mapped.

Once decoded and renamed, instructions may be ready to be scheduled for execution. In the illustrated embodiment, pick unit 225 may be configured to pick instructions that are ready for execution and send the picked instructions to issue unit 230. In some embodiments, pick unit 225 may be configured to maintain a pick queue that stores a number of decoded and renamed instructions as well as information about the relative age and status of the stored instructions. During each execution cycle, this embodiment of pick unit 225 may pick up to one instruction per slot. For example, taking instruction dependency and age information into account, for a given slot, pick unit 225 may be configured to pick the oldest instruction for the given slot that is ready to execute.

In some embodiments, pick unit 225 may be configured to support load/store speculation by retaining speculative load/store instructions (and, in some instances, their dependent instructions) after they have been picked. This may facilitate replaying of instructions in the event of load/store misspeculation. Additionally, in some embodiments, pick unit 225 may be configured to deliberately insert "holes" into the pipeline through the use of stalls, e.g., in order to manage downstream pipeline hazards such as synchronization of certain load/store or long-latency FGU instructions.

Issue unit 230 may be configured to provide instruction sources and data to the various execution units for picked instructions. In some embodiments, issue unit 230 may be configured to read source operands from the appropriate source, which may vary depending upon the state of the pipeline. For example, if a source operand depends on a prior instruction that is still in the execution pipeline, the operand may be bypassed directly from the appropriate execution unit result bus. Results may also be sourced from register files representing architectural (i.e., user-visible) as well as non-architectural state. In the illustrated embodiment, core 100 includes a working register file 260 that may be configured to store instruction results (e.g., integer results, floating point results, and/or condition code results) that have not yet been committed to architectural state, and which may serve as the source for certain operands. The various execution units may also maintain architectural integer, floating-point, and condition code state from which operands may be sourced.

Instructions issued from issue unit 230 may proceed to one or more of the illustrated execution units for execution. In some embodiments, each of EXU0 235 and EXU1 240 may be similarly or identically configured to execute certain integer-type instructions defined in the implemented ISA, such as arithmetic, logical, and shift instructions. In the illustrated embodiment, EXU0 235 may be configured to execute integer instructions issued from slot 0, and may also perform address calculations for load/store instructions executed by LSU 245. EXU1 240 may be configured to execute integer instructions issued from slot 1, as well as branch instructions. In some embodiments, FGU instructions and multicycle integer instructions may be processed as slot 1 instructions that pass through the EXU1 240 pipeline, although some of these instructions may actually execute in other functional units.

In some embodiments, architectural and non-architectural register files may be physically implemented within or near execution units 235-240. It is contemplated that in some embodiments, core 100 may include more or fewer than two integer execution units, and the execution units may or may not be symmetric in functionality. Also, in some embodiments execution units 235-240 may not be bound to specific issue slots, or may be differently bound than just described.

Load store unit 245 may be configured to process data memory references, such as integer and floating-point load and store instructions and other types of memory reference instructions. LSU 245 may include a data cache 250 as well as logic configured to detect data cache misses and to responsively request data from L2 cache 105. In some embodiments, data cache 250 may be configured as a set-associative, write-through cache in which all stores are written to L2 cache 105 regardless of whether they hit in data cache 250. As noted above, the actual computation of addresses for load/store instructions may take place within one of the integer execution units, though in other embodiments, LSU 245 may implement dedicated address generation logic. In some embodiments, LSU 245 may implement an adaptive, history-dependent hardware prefetcher configured to predict and prefetch data that is likely to be used in the future, in order to increase the likelihood that such data will be resident in data cache 250 when it is needed.

In various embodiments, LSU 245 may implement a variety of structures configured to facilitate memory operations. For example, LSU 245 may implement a data TLB to cache virtual data address translations, as well as load and store buffers configured to store issued but not-yet-committed load and store instructions for the purposes of coherency snooping and dependency checking. LSU 245 may include a miss buffer configured to store outstanding loads and stores that cannot yet complete, for example due to cache misses. In some embodiments, LSU 245 may implement a store queue configured to store address and data information for stores that have committed, in order to facilitate load dependency checking. LSU 245 may also include hardware configured to support atomic load-store instructions, memory-related exception detection, and read and write access to special-purpose registers (e.g., control registers).

Floating point/graphics unit 255 may be configured to execute and provide results for certain floating-point and graphics-oriented instructions defined in the implemented ISA. For example, in some embodiments FGU 255 may implement single- and double-precision floating-point arithmetic instructions compliant with the IEEE 754-1985 floating-point standard, such as add, subtract, multiply, divide, and certain transcendental functions. Also, in some embodiments FGU 255 may implement partitioned-arithmetic and graphics-oriented instructions defined by a version of the SPARC® Visual Instruction Set (VIS™) architecture, such as VIS™ 2.0 or VIS™ 3.0. In some embodiments, FGU 255 may implement fused and unfused floating-point multiply-add instructions. Additionally, in some embodiments FGU 255 may implement certain integer instructions such as integer multiply, divide, and population count instructions. Depending on the implementation of FGU 255, some instructions (e.g., some transcendental or extended-precision instructions) or instruction operand or result scenarios (e.g., certain denormal operands or expected results) may be trapped and handled or emulated by software.

In some embodiments, FGU 255 may implement separate execution pipelines for floating point add/multiply, divide/square root, and graphics operations, while in other embodiments the instructions implemented by FGU 255 may be differently partitioned. In various embodiments, instructions implemented by FGU 255 may be fully pipelined (i.e., FGU 255 may be capable of starting one new instruction per execution cycle), partially pipelined, or may block issue until complete, depending on the instruction type. For example, in some embodiments floating-point add and multiply operations may be fully pipelined, while floating-point divide operations may block other divide/square root operations until completed.

Embodiments of FGU 255 may also be configured to implement hardware cryptographic support. For example, FGU 255 may include logic configured to support encryption/decryption algorithms such as Advanced Encryption Standard (AES), Data Encryption Standard/Triple Data Encryption Standard (DES/3DES), the Kasumi block cipher algorithm, and/or the Camellia block cipher algorithm. FGU 255 may also include logic to implement hash or checksum algorithms such as Secure Hash Algorithm (SHA-1, SHA-256, SHA-384, SHA-512), or Message Digest 5 (MD5). FGU 255 may also be configured to implement modular arithmetic such as modular multiplication, reduction and exponentiation, as well as various types of Galois field operations. In some embodiments, FGU 255 may be configured to utilize the floating-point multiplier array for modular multiplication. In various embodiments, FGU 255 may implement several of the aforementioned algorithms as well as other algorithms not specifically described.

The various cryptographic and modular arithmetic operations provided by FGU 255 may be invoked in different ways for different embodiments. In some embodiments, these features may be implemented via a discrete coprocessor that may be indirectly programmed by software, for example by using a control word queue defined through the use of special registers or memory-mapped registers. In another embodiment, the ISA may be augmented with specific instructions that may allow software to directly perform these operations.

As previously described, instruction and data memory accesses may involve translating virtual addresses to physical addresses. In some embodiments, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 205 or data cache 250. In the event no translation for a given virtual page number is found in the appropriate TLB, memory management unit 270 may be configured to provide a translation. In some embodiments, MMU 270 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk or a hardware table walk.) In some embodiments, if MMU 270 is unable to derive a valid address translation, for example if one of the memory pages including a necessary page table is not resident in physical memory (i.e., a page miss), MMU 270 may be configured to generate a trap to allow a memory management software routine to handle the translation. It is contemplated that in various embodiments, any desirable page size may be employed. Further, in some embodiments multiple page sizes may be concurrently supported.

As noted above, several functional units in the illustrated embodiment of core 100 may be configured to generate off-core memory requests. For example, IFU 200 and LSU 245 each may generate access requests to L2 cache 105 in response to their respective cache misses. Additionally, MMU 270 may be configured to generate memory requests, for example while executing a page table walk. In the illustrated embodiment, L2 interface 265 may be configured to provide a centralized interface to the L2 cache 105 associated with a particular core 100, on behalf of the various functional units that may generate L2 accesses. In some embodiments, L2 interface 265 may be configured to maintain queues of pending L2 requests and to arbitrate among pending requests to determine which request or requests may be conveyed to L2 cache 105 during a given execution cycle. For example, L2 interface 265 may implement a least-recently-used or other algorithm to arbitrate among L2 requesters. In some embodiments, L2 interface 265 may also be configured to receive data returned from L2 cache 105, and to direct such data to the appropriate functional unit (e.g., to data cache 250 for a data cache fill due to miss).

During the course of operation of some embodiments of core 100, exceptional events may occur. For example, an instruction from a given thread that is selected for execution by select unit 210 may not be a valid instruction for the ISA implemented by core 100 (e.g., the instruction may have an illegal opcode), a floating-point instruction may produce a result that requires further processing in software, MMU 270 may not be able to complete a page table walk due to a page miss, a hardware error (such as uncorrectable data corruption in a cache or register file) may be detected, or any of numerous other possible architecturally-defined or implementation-specific exceptional events may occur. In some embodiments, trap logic unit 275 may be configured to manage the handling of such events. For example, TLU 275 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In some embodiments, TLU 275 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 275 may implement such traps as precise traps. That is, TLU 275 may ensure that all instructions from the given thread that occur before the trapping instruction (in program order) complete and update architectural state, while no instructions from the given thread that occur after the trapping instruction (in program) order complete or update architectural state.

Additionally, in the absence of exceptions or trap requests, TLU 275 may be configured to initiate and monitor the commitment of working results to architectural state. For example, TLU 275 may include a reorder buffer (ROB) that coordinates transfer of speculative results into architectural state. TLU 275 may also be configured to coordinate thread flushing that results from branch misprediction. For instructions that are not flushed or otherwise cancelled due to mispredictions or exceptions, instruction processing may end when instruction results have been committed.

In various embodiments, any of the units illustrated in FIG. 2 may be implemented as one or more pipeline stages, to form an instruction execution pipeline that begins when thread fetching occurs in IFU 200 and ends with result commitment by TLU 275. Depending on the manner in which the functionality of the various units of FIG. 2 is partitioned and implemented, different units may require different numbers of cycles to complete their portion of instruction processing. In some instances, certain units (e.g., FGU 255) may require a variable number of cycles to complete certain types of operations.

Through the use of dynamic multithreading, in some instances, it is possible for each stage of the instruction pipeline of core 100 to hold an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

As described previously, however, the various resources of core 100 that support fine-grained multithreaded execution may also be dynamically reallocated to improve the performance of workloads having fewer numbers of threads. Under these circumstances, some threads may be allocated a larger share of execution resources while other threads are allocated correspondingly fewer resources. Even when fewer threads are sharing comparatively larger shares of execution resources, however, core 100 may still exhibit the flexible, thread-specific flush and stall behavior described above.

Tag Generator for Out-of-Order Resource Allocation and Deallocation

As described above, each of cores 100 may be configured for multi-threaded, out-of-order execution. More specifically, in some embodiments, each of cores 100 may be configured to perform dynamic multithreading, such that the execution resources of cores 100 may be configured to efficiently process varying types of computational workloads that exhibit different performance characteristics and resource requirements. Moreover, as described previously, cores 100 may be configured to dynamically allocate a variety of hardware resources among the threads that are actively executing at a given time, such that if fewer threads are executing, each individual thread may be able to take advantage of a greater share of the available hardware resources. This may result in increased individual thread performance when fewer threads are executing. In some embodiments, to support out-of-order instruction execution and dynamic hardware resource allocation, cores 100 may be configured to execute out-of-order allocation and deallocation of the hardware resources within the core.

Out-of-order deallocation of resources may occur when the resources are deallocated in an order that is different from the order in which the resources were originally allocated. For example, resources of a particular resource type may be allocated to multiple system threads, which may be at various stages of execution. Since the threads are at various stages of execution, the resources may be released at different intervals, resulting in out-of-order deallocation of the resources. Specifically, the resources may be deallocated in an order different from the order in which the resources were allocated. In another example, a thread-specific flush may result in a flushing of all instructions associated with the thread and, consequently, the release of all resources allocated to those instructions. The released resources may also be deallocated from the flushed thread. The order of resource deallocation in this case may not be the same as the order in which the resources were allocated. As a result, out-of-order deallocation may occur.

As described above, resources of a particular resource type may be allocated to multiple system threads. In some embodiments, allocation of a set of resources of a particular resource type may be managed in a data structure that maps each resource instance to an element of the data structure. In some embodiments, the data structure elements may be sequentially addressable. When a set of similar resources has been allocated to multiple system threads over a period of several execution cycles, the resource allocation may be out-of-order with respect to the multiple threads, in some embodiments. For example, the resources represented by the first and second sequentially addressable elements of a data structure may be allocated to thread 1. Subsequently, the resource represented by the third element of the data structure may be allocated to thread 2. Thread 1 may then require an additional resource and be allocated the resource represented by the fourth element of the data structure. Subsequently, the resource represented by the fifth element of a data structure may be allocated to thread 2. In this example, resource allocation has been executed out-of-order with respect to the multiple threads. Specifically, allocation of resources to thread 1 has occurred subsequent to allocation of resources to thread 2. In this case, the data structure elements representing the resources allocated to thread 1 are not all sequentially adjacent. The data structure elements representing the resources allocated to thread 2 are also not sequentially adjacent.

Out of order deallocation of resources may also lead to out-of-order allocation of resources. For example, when a thread-specific flush occurs, as described above, the resources previously allocated to the flushed thread may become available for allocation to another thread. The elements of the data structure that represent the available resources may not necessarily be sequentially adjacent within the data structure. For example, considering the allocation scenario described above, if the second thread is flushed, the resources represented by the third and fifth data structure elements may become available for allocation, while the resources represented by the first, second and fourth elements remain allocated to thread 1. Thus, the resources represented by two non-sequentially adjacent elements of the data structure, i.e. the third and fifth elements, may become available for allocation to a next system thread. In some embodiments, these two resources may subsequently be allocated to a system thread requiring two resources of this particular resource type. In this case, since the data structure elements representing the resources allocated to the system thread are not adjacent within the data structure, as described above, the resources are allocated out-of-order.

As previously described, cores 100 may be configured to support dynamic allocation and deallocation of a variety of hardware resources among the threads that are actively executing at a given time. In some embodiments, select unit 210 of core 100 may be configured to perform the dynamic allocation and deallocation of hardware resources. As previously described, during any given execution cycle, select unit 210 may be configured to select up to one ready thread for execution and up to two instructions from the selected thread for decode by decode unit 215. In some embodiments, upon selection of the instruction(s), select unit 210 may be configured to allocate certain execution resources of core 100 to the selected instruction(s). Resources that are allocated to instructions operating within a thread may be considered to be allocated to the thread executing the instructions. Allocation of hardware resources to an instruction by select unit 210 may ensure that the allocated resources will not be used for the benefit of another instruction until the resources are released. In various embodiments, select unit 210 may allocate resources such as reorder buffer entries, load buffer entries, store buffer entries, or other downstream resources that may be utilized during instruction execution. In some embodiments, select unit 210 may also perform deallocation of hardware resources. Resources that are no longer needed by the instructions to which the resources were allocated may be deallocated by select unit 210. In some embodiments, select unit 210 may be configured to support deallocation of multiple resources in a single execution cycle. In various embodiments, select unit 210 may be configured to deallocate resources such as reorder buffer entries, load buffer entries, store buffer entries, or other resources that may be utilized during instruction execution.

Figure 3:
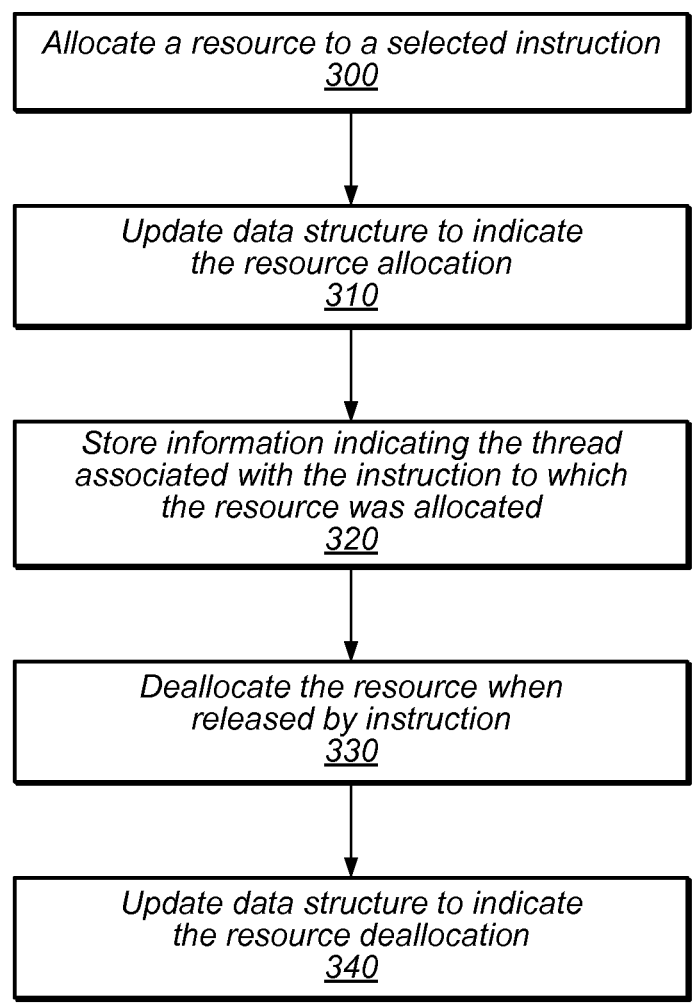
FIG. 3 is a flowchart illustrating a method for out-of-order allocation and deallocation of system resources, according to various embodiments.

As previously described, in various embodiments, select unit 210 may be configured to support out-of-order allocation and deallocation of resources. FIG. 3 is a flowchart illustrating a method for performing out-of-order allocation and deallocation of resources, according to various embodiments. In this example, the method may include allocating an execution resource to a selected instruction, as in 300. For example, in some embodiments, a select unit, such as select unit 210 may perform the allocation. In this example, the method may include updating a data structure to indicate that the resource has been allocated to a selected instruction, as in 310. In some embodiments, select unit 210 may include an allocate vector in which each entry corresponds to an instance of a resource of a particular resource type and indicates the allocation status of the resource instance. Select unit 210 may be configured to update an element of the data structure to indicate that the resource has been allocated to a selected instruction. For example, select unit 210 may include one allocate vector corresponding to entries of a reorder buffer, another allocate vector corresponding to entries of a load buffer, and yet another allocate vector corresponding to entries of a store buffer. As illustrated in FIG. 3, the method may include storing information indicating the thread associated with an instruction to which a resource is allocated, as in 320. For example, each thread in a multithreaded system may be associated with a unique thread identification number (tid). In some embodiments, select unit 210 may store this tid to indicate resources that have been allocated to the thread associated with the tid.

As illustrated by FIG. 3, the method may, in various embodiments, include performing deallocation of a system resource when the resource is released, as shown in 330. For example, in some embodiments, a select unit, such as select unit 210, may perform the deallocation in response to various system conditions that may cause a resource to be released by an instruction. For example, an instruction may successfully complete its execution and may no longer require the allocated resource. In this case, select unit 210 may be configured to deallocate the resource(s) allocated to the particular instruction. For example, when an instruction is committed, the instruction's allocated reorder buffer entry may be deallocated by select unit 210. In another example, a thread may release all allocated resources allocated to the given thread during a thread-specific flush, e.g., in response to an instruction exception or an external interrupt. As illustrated in FIG. 3, in response to the resource being deallocated, the method may include updating the corresponding resource allocate vector entry to indicate that the resource has been deallocated, as in 340. In some embodiments, a resource that has been deallocated may be eligible to participate in a subsequent allocation exercise during a future execution cycle.

While the example illustrated in FIG. 3 and discussed above describes the allocation and deallocation of a single resource, in some embodiments, select unit 210 may be configured to allocate and/or deallocate multiple resources (e.g., multiple instances of one resource type and/or resources of different types) in a single execution cycle to support improved machine performance. In some embodiments, multiple resources of different types may be assigned to an instruction in a single cycle. For example, select unit 210 may allocate both a store buffer entry and a reorder buffer entry to a store instruction during a single execution cycle. As described above, various system conditions may cause a single resource to be released and deallocated in a single execution cycle. Similarly, various system conditions may result in the release and deallocation of multiple resources in a single execution cycle (i.e. both the store buffer entry and the reorder buffer entry, in the example above). For example, a thread-specific flush may release all resources allocated to a particular thread. In this case, for better system performance, select unit 210 may be configured to release, in a single execution cycle, all resources allocated to the particular thread. In some embodiments, select unit 210 may be configured to use the stored tid for the flushed thread to locate all resources currently allocated to the flushed thread. In this embodiment, the select unit may be configured to deallocate, in a single execution cycle, all of the resources allocated to the flushed thread.

In some embodiments, select unit 210 may include a resource tag generator configured to support out-of-order allocation and deallocation of resources. The resource tag generator may be configured to generate resource tags for use by select unit 210. In some embodiments, each resource tag may represent one instance of an available resource. The resource tag generator may be configured to provide available resource tags to select unit 210 to support out-of-order allocation of a resource to an instruction. The resource tag generator may also reclaim resource tags from select unit 210 to support out-of-order deallocation of instructions. In other embodiments, the resource tag generator may be included within other units of core 100 or may be a separate unit within core 100.

In some embodiments, the resource tag generator of select unit 210 may be configured to use multiple resource allocate vectors to provide available resource tags of different types to select unit 210. For example, select unit 210 may be configured to employ an allocate vector corresponding to a reorder buffer, another allocate vector corresponding to a load buffer and yet another allocate vector corresponding to a store buffer. In various embodiments, a resource allocate vector may include multiple entries, and each entry may correspond to one instance of a particular resource type. In some embodiments, the entries of a resource allocate vector may be sequentially addressable. In various embodiments, the number of entries in a resource allocate vector may represent the total number of resources available for the particular resource type represented by the resource allocate vector. A resource allocate vector entry representing an instance of a particular resource type may be considered a resource tag. The value of each entry in a resource allocate vector may indicate whether the corresponding resource tag has been allocated in the system. For example, an entry value of zero may indicate that a resource tag is available for allocation and an entry value of one may indicate that the resource tag has been allocated and is unavailable. In some embodiments, all entries of the resource allocation vector may initially be zero, since no resource tags have been allocated. Once a resource tag has been allocated, the resource tag generator may be configured to set the corresponding entry of the resource allocate vector to a value of one. Upon deallocation of the resource, resource tag generator may be configured to reset the corresponding entry of the resource allocate vector to a value of zero. In other embodiments, different encodings of the values of each entry or of collections of entries in a resource allocate vector may be used to indicate whether resources are available for allocation.

In some embodiments, a resource allocate vector may be shared between multiple threads, enabling allocation of a particular resource type to the multiple threads within a multi-threaded system. As described above, in some embodiments, select unit 210 may be configured to store a thread identification (tid) to indicate resources that have been allocated to a particular thread. For example, when a resource is allocated and the corresponding allocation vector entry updated to indicate allocation of the resource, the tid for the thread to which the resource was allocated may be stored in association with the corresponding allocation vector entry. In some embodiments, the tid may be stored in the resource allocate vector entry corresponding to the resource that has been allocated to the thread. In other embodiments, the tid may be stored in another data structure within select unit 210, and may be associated with the resource allocate vector entry corresponding to the resource that has been allocated to the thread.

In some embodiments, the resource allocate vectors may be used by the resource tag generator of select unit 210 to manage out-of-order allocation and deallocation of resources. As described above, each entry of a resource allocate vector may correspond to a respective instance of a particular resource type and the entries of the resource allocate vector may be sequentially addressable. The resource tag generator may be configured to update the value of a resource allocate vector entry to indicate that the corresponding resource has been allocated or deallocated, as described above. In some embodiments, this allocation or deallocation process may occur out-of-order when the resource tag generator updates an entry of the resource allocate vector that is not sequentially adjacent to another entry updated in the last allocation or deallocation operation for a resource of the same type.

Figure 5A:
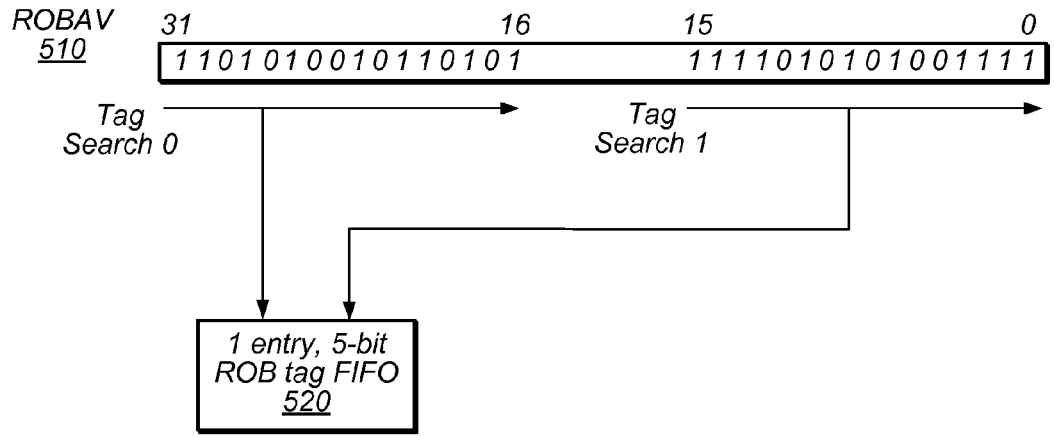
FIG. 5A illustrates one embodiment of a resource tag search in a reorder buffer allocate vector (ROBAV).

As noted above, the resource tag generator of select unit 210 may be configured to use resource allocate vectors to provide resource tags of shared resources to select unit 210. In one example, a 32-entry reorder buffer allocate vector (ROBAV) may be maintained by the resource tag generator and used to manage the resources of the reorder buffer (ROB). One such ROBAV is illustrated in FIG. 5A and described in more detail below. The ROBAV may be configured to indicate allocation and deallocation of the 128 entries available in the ROB. A ROB entry may be configured to maintain state information associated with an instruction, beginning when the instruction enters the rename state. Upon successful commitment of the instruction without exception, the ROB entry may no longer reflect state information associated with the instruction. In some embodiments, the ROB entry may be deallocated upon successful commitment of the instruction. In this example, the 32-entry ROBAV may be configured to represent the 128 entries of the ROB. Thus, each entry in the 32-bit ROBAV may represent four of the 128 ROB tags. For example, entry 0 in the ROBAV may represent ROB tags 0, 1, 2, and 3, entry 1 may represent ROB tags 4, 5, 6, and 7, and so on. In some embodiments, representing four ROB tags with a single ROBAV entry may improve the efficiency of tag management, as it may be easier to manage 32 tags as opposed to 128 tags. In addition, tag generation logic may be simplified, with a ROBAV length of 32 entries instead of 128 entries. In other embodiments, different size groups of the ROB tags may be used, or grouping of ROB tags may not be used at all.

In some embodiments, the resource tag generator may be configured to provide a group of four ROB tags represented by one entry in the ROBAV vector to select unit 210 for allocation to selected instructions. In some embodiments, the four ROB tags may be allocated, one to each instruction, by select unit 210. When the first ROB tag from a group is allocated, the tid for the thread to which the ROB tag is allocated may be associated with the ROBAV entry corresponding to the ROB tag group, as described above. The remaining ROB tags from the ROB tag group may now be reserved for that particular thread, since the tid has already been preserved in association with the group. Select unit 210 may be configured to allocate the remaining ROB tags from the group to the particular thread in subsequent cycles. In some embodiments, the resource tag generator may also be configured to reclaim groups of ROB resource tags that have been deallocated. When a group of ROB tags is allocated or deallocated, the resource tag generator may update the corresponding entry in the ROBAV to indicate the change in availability of the ROB tags.

Another example of a resource allocate vector is a store buffer allocate vector (SBAV). In some embodiments, a 32-entry SBAV may be maintained by the resource tag generator and used to manage the resources of the store buffer (SB). The SBAV may be configured to indicate allocation and deallocation of the 32 entries available in the SB. An SB entry may be configured to hold store data for an uncommitted store instruction. In some embodiments, the SB entry may be deallocated upon successful commitment of the store instruction. In this example, the 32-entry SBAV may be configured to represent the 32 entries of the SB. Thus, each SB entry may be represented by a respective SB resource tag in the SBAV. For example, entry 0 in the SBAV may represent SB tag 0, entry 1 may represent SB tag 1, and so on. In some embodiments, the resource tag generator may be configured to provide available SB resource tags to select unit 210 for allocation to selected instructions. In some embodiments, the resource tag generator may also be configured to reclaim SB resource tags that have been deallocated. When an SB tag is allocated or deallocated, the resource tag generator may update the corresponding entry in the SBAV to indicate the change in availability of the SB tag.

In yet another example, a 64-entry load buffer allocate vector (LBAV) may be maintained by the resource tag generator and used to manage the resources of the load buffer (LB). The LBAV may be configured to indicate allocation and deallocation of the 64 entries available in the LB. An LB entry may be configured to hold load instructions which have been issued but not yet committed. In some embodiments, LBAV the LB entry may be deallocated upon successful commitment of the load instruction. In this example, the 64-entry LBAV may be configured to represent the 64 entries of the LB. Thus, each LB entry may be represented by a respective LB resource tag in the LBAV. For example, entry 0 in the LBAV may represent LB tag 0, entry 1 may represent LB tag 1, and so on. In some embodiments, the resource tag generator may be configured to provide available LB resource tags to select unit 210 for allocation to selected instructions. In some embodiments, the resource tag generator may also be configured to reclaim LB resource tags that have been deallocated. When an LB tag is allocated or deallocated, the resource tag generator may update the corresponding entry in the LBAV to indicate the change in availability of the LB tag.

Figure 4:
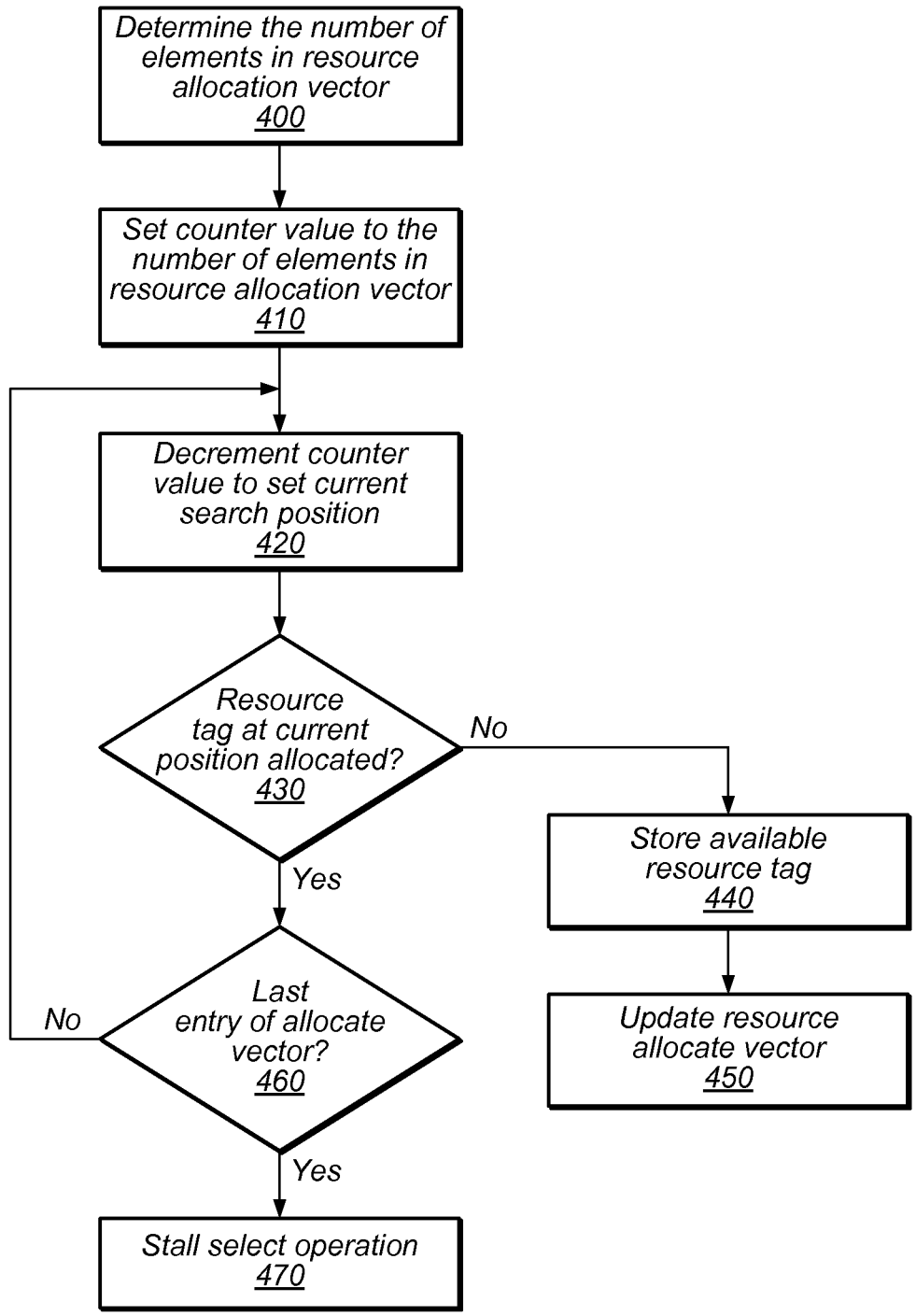
FIG. 4 is a flowchart illustrating a method for finding the next available resource in a resource allocation vector, according to various embodiments.

In some embodiments, the resource tag generator of select unit 210 may perform a search of an allocate vector to locate a resource tag available for allocation. In various embodiments, the tag generator may be configured to search an allocate vector during each execution cycle and to store available resource tag(s) such that the tag(s) are ready for select unit 210 to allocate to selected instructions. Searching for available resources during each execution cycle before the resources have been requested by select unit 210 may decrease latency times, as instructions may not be delayed while waiting for searches to complete. FIG. 4 is a flowchart illustrating a method of searching for an available resource tag in a resource allocate vector, according to various embodiments. In this example, the method may include determining the number of total entries included in a resource allocate vector, as shown in 400. For example, in some embodiments, a resource tag generator of select unit 210 may determine the total number of entries included in a resource allocate vector for a particular resource. In this example, the method may include setting a counter value equal to the number of total entries, as in 410. In some embodiments, the counter value may be configured to represent an index position within the resource allocate vector and a resource tag generator of select unit 210 may be configured to use the counter value to single-step through each entry of the vector.

As illustrated in FIG. 4, the method may include setting the starting search position by decrementing the counter, as in 420. In some embodiments, the entries of a resource allocate vector may be indexed from right to left, with the rightmost entry at index position 0 and the leftmost entry at an index position equal to one less than the total number of entries. Thus, in some embodiments, the operation illustrated at 420 may include the resource tag generator setting the starting search position at the leftmost entry of the resource allocate vector. As illustrated in FIG. 4, the method may include examining the value of the resource allocate vector entry at the index position indicated by the counter, as shown in 430. For example, the resource tag generator may determine, based on the value of the vector entry, whether the corresponding resource tag has been allocated. If the resource tag generator determines that the resource tag has not been allocated, shown as the negative exit of 430, the search is complete. The resource tag generator has found an available resource tag at the position indicated by the current counter value. In some embodiments, the available resource tag, or an identifier thereof, may be stored, as in 440, within select unit 210 for allocation to a selected instruction. For example, a resource tag identifier may be stored in a FIFO structure within select unit 210, thus indicating that the resource is available for allocation. In some embodiments, the method may include updating the allocate vector, as in 450, indicating that the allocated resource is no longer available.

In the method illustrated by FIG. 4, if the resource tag at the current search position in the vector has already been allocated, shown as the positive exit of 430, the method may include determining whether the last entry of the allocate vector has been reached, as in 460. For example, if the search counter value is equal to zero, the index position in the vector may also be zero, indicating that the last entry of the vector has been reached. If the last entry of the vector has been reached, shown as the positive exit of 460, the method may include stalling the operation of select unit 210, as in 470. If additional entries remain in the resource allocate vector, shown as the negative exit of 460, the method may include continuing the search for an available resource tag. As shown by the feedback from 460 to 420, the method may include decrementing the value of the counter, moving the search position to the next vector entry. In some embodiments, the resource tag search may continue in a similar manner, repeating the operations illustrated in 420, 430 and 460 until an available resource tag is found or until all resource allocate vector entries have been examined.

While the example above describes one search through a resource allocate vector to obtain a single available resource tag, in other embodiments multiple searches may be performed. For example, a faster search result may be returned if multiple searches are performed concurrently within a resource allocate vector. In some embodiments, the vector may be divided into two or more sections and a separate search may be performed on each section of the vector. The searches may execute in the same direction, (e.g., from left-to-right through the resource allocate vector, as described above), or the searches may proceed from opposite ends of the vector, in different embodiments. In some embodiments, when multiple searches are performed from opposite ends of the resource allocate vector, the searches may overlap, and may examine at least some of the same entries of the vector. In the case of such an overlap, special logic may be used to determine how to allocate an available resource in response to finding only one (or zero) available resource(s) in the allocate vector. These multiple, concurrent searches may enable a faster search result, as multiple portions of the vector may be examined simultaneously. In some embodiments, the search result may be the first available resource tag discovered by any of the multiple searches. If two or more searches return a result at the same time, the tag generator may prioritize the search results to ensure that there is only one final search result. In some embodiments, the index position of the resource tag may determine a priority of the resource tag. For example, tag 0 may have the highest priority and tag 31 may have the lowest priority, according to some embodiments.

The methods for performing multiple searches described above may be further illustrated by way of example. FIG. 5A illustrates an example of an ROBAV search in which the resource tag generator of select unit 210 may search the 32-entry ROBAV to locate an available group of ROB tags, according to some embodiments. In this example, two independent tag searches of ROBAV 510 may be executed concurrently, in the upper and lower halves of the allocate vector. For example, left-to-right tag searches 0 and 1 may be performed on ROBAV[31:16], and ROBAV[15:0], respectively, as shown in FIG. 5A. The search may return a 5-bit encoding corresponding to the first available resource tag group discovered in the search. If both searches return a search result at the same time, the resource tag generator may be configured to prioritize the two search results, as described above, to ensure that there is only one final search result. As described above, the resource tag generator may be configured to store an available resource tag group to indicate that the group is ready when needed by select unit 210 for allocation to a selected instruction. For example, in some embodiments, the resource tag generator may be configured to fill a single-entry ROB tag FIFO 520 with the 5-bit encoding that corresponds to the available resource tag group. In some embodiments, the resource tag generator may be configured to perform a search of ROBAV 510 for each execution cycle in an effort to keep the single-entry ROB tag FIFO 520 full. In addition to adding the 5-bit encoding to ROB tag FIFO 520, the tag generation logic may also be configured to update the corresponding entry in ROBAV 510 to indicate that the resource tag group is no longer available.

In another example (not shown), the resource tag generator of select unit 210 may search a 32-entry SBAV to locate an available SB tag. In a manner similar to that described above, two independent tag searches of the SBAV may be executed concurrently, in the upper and lower halves of the allocate vector. For example, left-to-right tag searches 0 and 1 may be completed on SBAV [31:16], and SBAV [15:0], respectively. The search may return a 5-bit encoding corresponding to the first available resource tag discovered in the search. If both searches return a search result at the same time, the resource tag generator may be configured to prioritize the two search results as described above, to determine the final search result. As described above, the resource tag generator may be configured to store an available resource tag to indicate that the tag is available when needed by select unit 210 for allocation to a selected instruction. For example, the resource tag generator may be configured to fill a single-entry SB tag FIFO with the 5-bit encoding that corresponds to the available resource tag. In some embodiments, the resource tag generator may be configured to perform a search of the SBAV for each execution cycle in an effort to keep a single-entry SB tag FIFO full. In addition to adding the 5-bit encoding to the SB tag FIFO when an available resource tag is located, the resource tag generator may also be configured to update the corresponding entry in the SBAV to indicate that the resource tag is no longer available.

In some embodiments, multiple searches through a resource allocate vector may be performed to obtain multiple search results. In various embodiments, select unit 210 may allocate more than one resource tag to a selected instruction within a single execution cycle. In this case, the resource tag generator may perform multiple searches of the vector in a manner similar to that described above, resulting in multiple search results rather than a single search result. In some embodiments, the multiple search results may be stored in one or more multiple entry FIFOs.

Figure 5B:
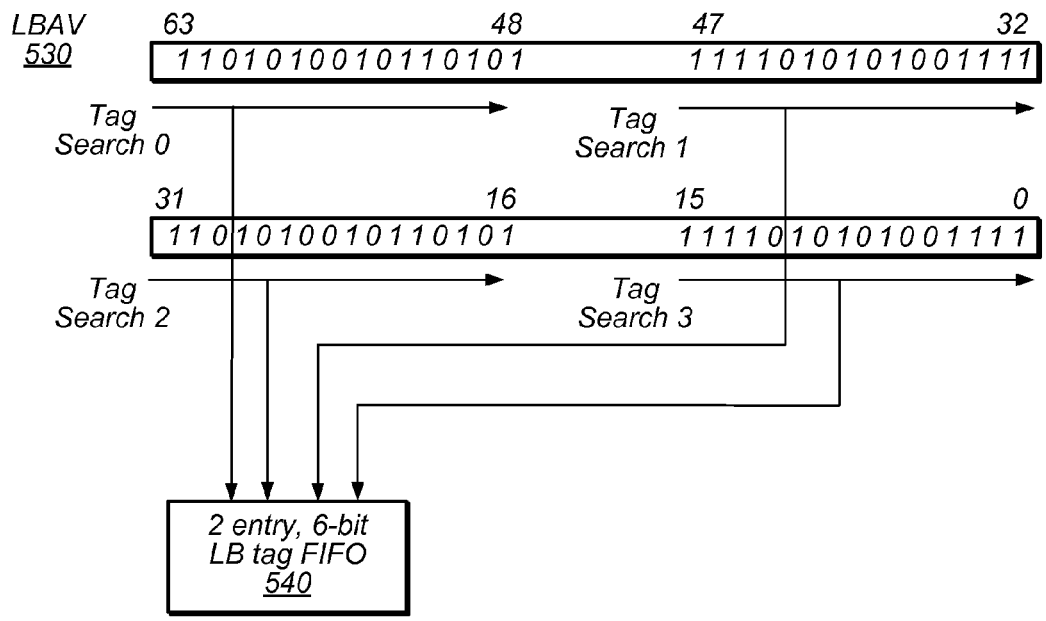
FIG. 5B illustrates one embodiment of a resource tag search in a store buffer allocate vector (LBAV).

In one example, illustrated in FIG. 5B, the resource tag generator of select unit 210 may be configured to search a 64-entry LBAV to locate two available LB tags. In this example, four independent tag searches of LBAV 530 may be executed concurrently. As illustrated in FIG. 5B, left-to-right tag searches 0, 1, 2, and 3 may be performed on LBAV [63:48], LBAV [47:32], LBAV [31:16], and LBAV [15:0], respectively. The search may return two 6-bit encodings corresponding to the first two available resource tags discovered in the search. If multiple searches return a search result at the same time, the resource tag generator may be configured to prioritize the search results as described above, to determine the final search result. As described above, the resource tag generator may be configured to store available resource tags to indicate that the tags are available when needed by select unit 210 for allocation to a selected instruction. For example, the resource tag generator may be configured to fill a two-entry LB tag FIFO 540 with the 6-bit encodings that correspond to the two available resource tags. In some embodiments, the resource tag generator may be configured to perform a search of the LBAV for each execution cycle in an effort to keep a two-entry LB tag FIFO full. In addition to adding the 6-bit encodings to the LB tag FIFO when an available resource tags are located, the resource tag generator may also be configured to update the corresponding entries in the LBAV to indicate that the resource tags are no longer available.

In some embodiments, pick unit 225 may be configured to support out-of-order allocation and deallocation of resources. As described above, pick unit 225 may be configured to maintain a pick queue that stores a number of decoded and renamed instructions. In some embodiments, the allocation and deallocation of pick queue entries may be out-of-order within an individual thread and also with respect to multiple threads. Rename unit 220 may be configured to allocate pick queue entries to instructions after the instructions have been renamed. For example, rename unit 220 may be configured to set a valid bit for a corresponding pick queue entry to indicate that the pick queue entry has been allocated to an instruction. Pick unit 225 may be configured to deallocate pick queue entries allocated to an instruction once the corresponding instruction has been picked for execution and is free from load-speculation. In some embodiments, allocation of the pick queue entries may be out-of-order due to out-of-order deallocation of the pick queue entries, as described herein.

As described above, pick unit 225 may be configured to pick instructions that are ready for execution and to send the picked instructions to issue unit 230. In some embodiments the algorithm used by pick unit 225 to pick instructions may be dependent on instruction dependencies, instruction age, and/or a history of execution slot assignments. As a result, instructions may be picked out-of-order from the pick queue, and, thus, the pick queue entries may be deallocated out-of-order, as described herein. In addition, load/store instructions may not be free of load-speculation when the instructions are picked. In some embodiments, deallocation of the pick queue entries allocated to the load/store instructions may not occur until the instructions are free of load-speculation. This delay may also result in out-of-order deallocation.

In some embodiments, multiple pick queue entries may be allocated or deallocated out-of-order in a single execution cycle. For example, rename unit 220 may be configured to allocate up to three pick queue entries in a single cycle. In some embodiments, pick unit 225 may be configured to deallocate multiple pick queue entries in a single execution cycle. For example, during a single cycle, pick unit 225 may deallocate the pick queue entries allocated to two instructions that have been sent to issue unit 230 and the pick queue entries allocated to two load/store instructions that have been cleared from load-speculation. In another example, the pick queue may deallocate all pick queue entries allocated to a particular thread in response to a flush of the thread.

Figure 6A:
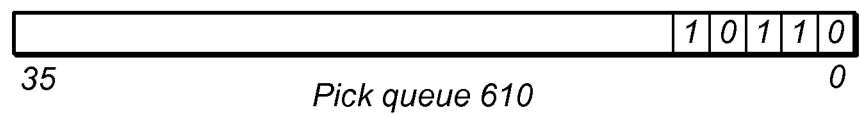
FIG. 6A illustrates a pick queue and a deallocate vector prior to deallocation of various pick queue entries, according to some embodiments.
Figure 6A:
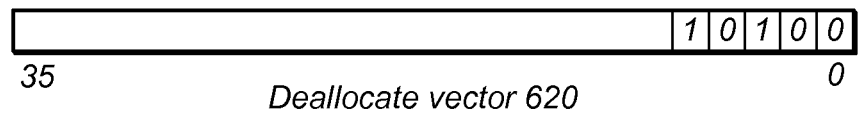

In some embodiments, pick unit 225 may be configured to maintain a deallocate vector which may support deallocation of multiple pick queue entries in a single cycle. In such embodiments, the deallocate vector may be used as a mask, with each entry in the deallocate vector indicating whether the corresponding entry in the pick queue should be deallocated. The deallocate vector may be used by pick unit 225 during each execution cycle to deallocate the appropriate pick queue entries, in some embodiments. FIG. 6A illustrates a deallocate vector that may be used by pick unit 225 to deallocate multiple entries in the pick queue, according to various embodiments. For example, each pick queue entry may include a valid bit, which may be configured to indicate whether the pick queue entry is currently allocated. In this example, a valid bit equal to one may indicate that the corresponding pick queue entry is currently allocated to an instruction. In this example, each entry of the deallocate vector may be configured to correspond to an entry in the pick queue and the value of each deallocate vector entry may indicate whether the corresponding pick queue entry should be deallocated. FIG. 6A illustrates a pick queue 610 and corresponding deallocate vector 620 prior to execution of a pending dellocation operation. In this example, a value of one in an entry of deallocate vector 620 may indicate that the corresponding entry in pick queue 610 should be deallocated.

Figure 6B:
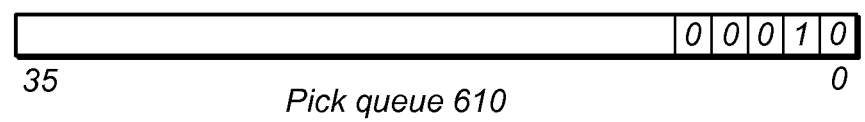
FIG. 6B illustrates a pick queue after deallocation of multiple pick queue entries, according to some embodiments.

In some embodiments, an XOR operation between the deallocate vector and the valid bits of the pick queue may result in a pick queue in which the appropriate entries have been deallocated. For example, FIG. 6B illustrates the valid bits of pick queue 610 following the execution of an XOR operation between the valid bits of pick queue 610 and deallocate vector 620. As illustrated in this example, each value of one in an entry of deallocate vector 620 may result in deallocation of a corresponding entry in pick queue 610. In other embodiments, different values of the vector entries and different logical operations may be used to manage allocation and/or deallocation of pick queue entries. In some embodiments, deallocation of the multiple pick queue entries indicated by a deallocate vector may occur in a single execution cycle. For example, in the case of a thread-specific flush, the deallocate vector may be configured to cause all pick queue entries that are allocated to the particular thread being flushed to be deallocated. In some embodiments, the tid for the thread being flushed may be used to set the corresponding deallocate vector entries for all pick queue entries allocated to the thread. In such embodiments, an XOR operation between the deallocate vector and the pick queue may result in a pick queue in which all tags allocated to a particular thread have been deallocated. In some embodiments, all bits of the deallocate vector may be set to support deallocation of all pick queue entries in a single cycle.

Example System Embodiment

Figure 7:
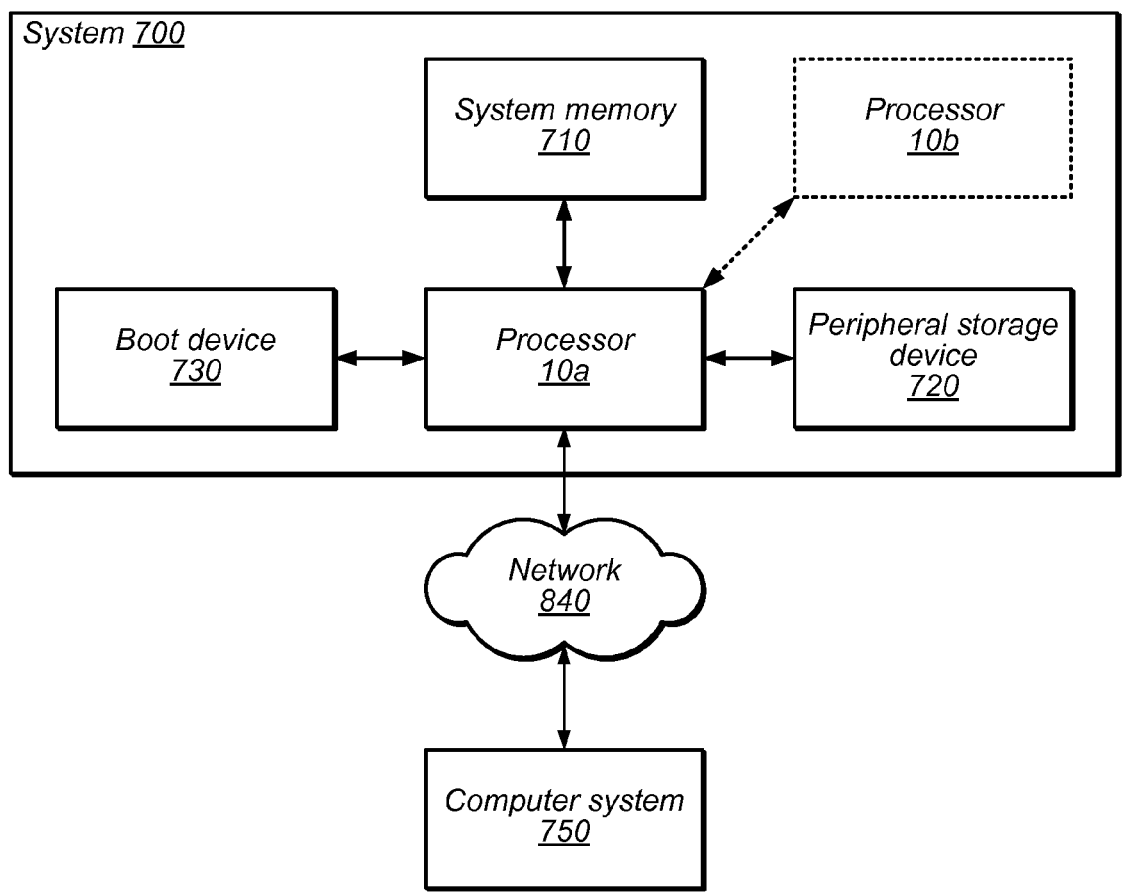
FIG. 7 is a block diagram illustrating one embodiment of a system including a multithreaded processor.

As described above, in some embodiments, processor 10 of FIG. 1 may be configured to interface with a number of external devices. One embodiment of a system including processor 10 is illustrated in FIG. 7. In the illustrated embodiment, system 700 includes an instance of processor 10, shown as processor 10a, that is coupled to a system memory 710, a peripheral storage device 720 and a boot device 730. System 700 is coupled to a network 740, which is in turn coupled to another computer system 750. In some embodiments, system 700 may include more than one instance of the devices shown. In various embodiments, system 700 may be configured as a rack-mountable server system, a standalone system, or in any other suitable form factor. In some embodiments, system 700 may be configured as a client system rather than a server system.

In some embodiments, system 700 may be configured as a multiprocessor system, in which processor 10a may optionally be coupled to one or more other instances of processor 10, shown in FIG. 7 as processor 10b. For example, processors 10a-b may be coupled to communicate via their respective coherent processor interfaces 140.

In various embodiments, system memory 710 may comprise any suitable type of system memory as described above, such as FB-DIMM, DDR/DDR2/DDR3/DDR4 SDRAM, or RDRAM®, for example. System memory 710 may include multiple discrete banks of memory controlled by discrete memory interfaces in embodiments of processor 10 that provide multiple memory interfaces 130. Also, in some embodiments, system memory 710 may include multiple different types of memory.

Peripheral storage device 720, in various embodiments, may include support for magnetic, optical, or solid-state storage media such as hard drives, optical disks, nonvolatile RAM devices, etc. In some embodiments, peripheral storage device 720 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc. In some embodiments, peripheral storage device 720 may be coupled to processor 10 via peripheral interface(s) 150 of FIG. 1.

As described previously, in some embodiments boot device 730 may include a device such as an FPGA or ASIC configured to coordinate initialization and boot of processor 10, such as from a power-on reset state. Additionally, in some embodiments boot device 730 may include a secondary computer system configured to allow access to administrative functions such as debug or test modes of processor 10.

Network 740 may include any suitable devices, media and/or protocol for interconnecting computer systems, such as wired or wireless Ethernet, for example. In various embodiments, network 740 may include local area networks (LANs), wide area networks (WANs), telecommunication networks, or other suitable types of networks. In some embodiments, computer system 750 may be similar to or identical in configuration to illustrated system 700, whereas in other embodiments, computer system 750 may be substantially differently configured. For example, computer system 750 may be a server system, a processor-based client system, a stateless "thin" client system, a mobile device, etc. In some embodiments, processor 10 may be configured to communicate with network 740 via network interface(s) 160 of FIG. 1.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed:

1. A method, comprising:
performing, by a computer processor core:
allocating two or more of a plurality of downstream resources of the computer processor core to one or more of a plurality of threads, wherein the plurality of downstream resources comprise two or more elements of a branch predictor structure, an instruction issue structure, a register mapping table, a translation lookaside buffer, a reorder buffer, a load buffer, a store buffer or a pick queue downstream from pre-execution instruction buffer within an instruction processing pipeline of the computer processor core and are dynamically shared between the plurality of threads, wherein allocating the two or more of the plurality of downstream resources of the computer processor core includes allocating each respective one of the two or more of the plurality of downstream resources of the computer processor core to a respective instruction of a respective thread of said one or more of the plurality of threads, said allocating comprising, for individual ones of the respective instructions:
examining contents of individual elements of a data structure in a sequential order of the data structure until a first element in the sequential order of the data structure is located that indicates a corresponding one of the downstream resources is available, wherein the examination is performed before the respective downstream resource for the respective instruction is requested;

updating the located element of the data structure to indicate that the respective downstream resource has been allocated to the respective instruction of the respective thread, wherein the data structure comprises a plurality of sequentially addressable elements, each element mapped to a respective downstream resource of the plurality of downstream resources for indicating allocation of the respective downstream resource, wherein the two or more updated elements corresponding to the two or more downstream resources are updated in an order; and deallocating at least one of the plurality of downstream resources after the at least one downstream resource has been released for the respective instruction of the respective thread of said one or more of the plurality of threads, said deallocating comprising updating the data structure to indicate that the at least one of the plurality of downstream resources has been deallocated, wherein the deallocated downstream resource is available for allocation to an instruction of a different thread of the plurality threads;

wherein said deallocating updates at least one element of the data structure in a different order than the order for said allocating.

2. The method of claim 1, wherein the data structure comprises a number of elements equal to a maximum number of available resources of a particular resource type.

3. The method of claim 1, wherein said updating the respective element of the data structure to indicate that the respective downstream resource has been allocated to the respective instruction comprises updating a data structure element associated with the one of the plurality of downstream resources such that the updated data structure element comprises a value indicating that the one of the plurality of downstream resources has been allocated.

4. The method of claim 1, wherein said updating the respective element of the data structure to indicate that the respective downstream resource has been allocated to the respective instruction comprises storing an identifier of the one of the plurality of threads in a data structure element associated with the one of the plurality of downstream resources.

5. The method of claim 1, further comprising:
performing, by the computer processor core:
searching the data structure to determine a next downstream resource available for allocation, wherein a search result returns a value indicating a downstream resource available for allocation;
wherein the value returned by the search result indicates the one of the plurality of downstream resources to be allocated to one of a plurality of threads.

6. The method of claim 5, wherein said searching the data structure comprises performing two or more concurrent searches on the data structure.

7. The method of claim 1,
wherein said deallocating comprises deallocating a plurality of the downstream resources allocated to the one of the plurality of threads in a single execution cycle; and
wherein said updating the data structure to indicate that the at least one of the plurality of downstream resources has been deallocated comprises updating a respective data structure element associated with each of the deallocated downstream resources.

8. The method of claim 7, wherein at least one of the respective data structure elements associated with the deallocated downstream resources is not adjacent to any other ones of the respective data structure elements associated with the deallocated downstream resources.

9. The method of claim 1, further comprising:
performing, by the computer processor core:
accessing a deallocate vector identifying one or more of the plurality of downstream resources for deallocation;
wherein said deallocating comprises deallocating at least one of the one or more of the plurality of downstream resources identified by the deallocate vector.

10. A processor, comprising:
a plurality of downstream resources of the processor accessible to a plurality of threads executing on the processor, wherein the plurality of downstream resources comprise two or more elements of a branch predictor structure, an instruction issue structure, a register mapping table, a translation lookaside buffer, a reorder buffer, a load buffer, a store buffer or a pick queue downstream from pre-execution instruction buffer within an instruction processing pipeline of the processor and are dynamically shared between the plurality of threads; and
a select unit configured to:
allocate two or more of the plurality of downstream resources of the processor to a respective instruction of a respective thread of one or more of the plurality of threads, wherein to allocate two or more of the plurality of downstream resources the select unit is further configured to, for individual ones of the respective instructions:
examine contents of individual elements of a data structure in a sequential order of the data structure until a first element in the sequential order of the data structure is located that indicates a corresponding one of the downstream resources is available, wherein the examination is performed before the respective downstream resource for the respective instruction is requested;
update the located respective element of the data structure instantiated in a memory accessible to the processor to indicate that the respective downstream resource has been allocated to the respective instruction of the respective thread, wherein the data structure comprises a plurality of sequentially addressable elements, each element mapped to a respective downstream resource of the plurality of downstream resources for indicating allocation of the respective downstream resource, wherein two or more updated elements corresponding to the two or more allocated downstream resources are updated in an order; and
deallocate at least one of the plurality of downstream resources after the at least one downstream resource has been released for the respective instruction of the respective thread of said one or more of the plurality of threads, wherein to deallocate at least one of the plurality of downstream resources the select unit is further configured to:
update the data structure to indicate that the at least one of the plurality of downstream resources has been deallocated, wherein the deallocated downstream resource is available for allocation to an instruction of a different thread of the plurality threads;

wherein said deallocating updates at least one element of the data structure in a different order than the order for said allocating.

11. The processor of claim 10, wherein to update the data structure to indicate that the respective downstream resource has been allocated to the respective instruction, the select unit is configured to:

update a data structure element associated with the respective downstream resource such that the updated data structure element comprises a value indicating that the respective downstream resource has been allocated or store an identifier of the respective thread in a data structure element associated with the respective downstream resource.

12. The processor of claim 10, wherein the select unit is further configured to:

search the data structure to determine a next downstream resource available for allocation;

wherein a search result returns a value indicating a particular downstream resource available for allocation; and wherein to allocate two or more of the plurality of downstream resources to the respective instruction of one or more of the plurality of threads executing on the processor, the select unit is configured to allocate the particular downstream resource indicated by the value returned by the search result.

13. The processor of claim 10, wherein the select unit is further configured to:

deallocate a plurality of downstream resources allocated to the one of the plurality of threads in a single execution cycle;

wherein to update the data structure to indicate that the at least one of the plurality of downstream resources has been deallocated, the select unit is configured to update a respective data structure element associated with each of the deallocated downstream resources.

14. The processor of claim 13, wherein at least one of the respective data structure elements associated with the deallocated downstream resources is not adjacent to any other ones of the respective data structure elements associated with the deallocated downstream resources.

15. The processor of claim 10, wherein the select unit is further configured to:

access a deallocate vector identifying one or more of the plurality of downstream resources for deallocation;

wherein to deallocate at least one of the plurality of downstream resources, the select unit is configured to deallocate at least one of the one or more of the plurality of downstream resources identified by the deallocate vector.

16. A system, comprising:
a processor; and
a memory coupled to the processor;
wherein the processor comprises a select unit configured to:

allocate two or more of a plurality of downstream resources of the processor to a respective instruction of a respective thread of one or more of a plurality of threads, wherein the plurality of downstream resources comprise two or more elements of a branch predictor structure, an instruction issue structure, a register mapping table, a translation lookaside buffer, a reorder buffer, a load buffer, a store buffer or a pick queue downstream from pre-execution instruction buffer within an instruction processing pipeline of the processor and are dynamically shared between the plurality of threads, said allocating comprising, for individual ones of the respective instructions:

examining contents of individual elements of a data structure in a sequential order of the data structure until a first element in the sequential order of the data structure is located that indicates a corresponding one of the downstream resources is available, wherein the examination is performed before the respective downstream resource for the respective instruction is requested;

updating the located element of the data structure instantiated in the memory to indicate that the respective downstream resource has been allocated to the respective instruction of the respective thread, wherein the data structure comprises a plurality of sequentially addressable elements, each element mapped to a respective downstream resource of the plurality of downstream resources for indicating allocation of the respective downstream resource, wherein the two or more updated elements corresponding to the two or more downstream resources are updated in an order; and deallocate at least one of the plurality of downstream resources after the at least one downstream resource has been released for the respective instruction of the respective thread of said one or more of the plurality of threads; and update the data structure to indicate that the at least one of the plurality of downstream resources has been deallocated, wherein the deallocated downstream resource is available for allocation to an instruction of a different thread of the plurality threads;

wherein said deallocating updates at least one element of the data structure in a different order than the order for said allocating.

17. The system of claim 16, wherein to update the data structure to indicate that the respective downstream resource has been allocated to the respective thread, the select unit is configured to:

update a data structure element associated with the respective downstream resource such that the updated data structure element comprises a value indicating that the respective downstream resource has been allocated or store an identifier of the respective thread in a data structure element associated with the respective downstream resource.

18. The system of claim 16, wherein the select unit is further configured to:

search the data structure to determine a next downstream resource available for allocation;

wherein a search result returns a value indicating a particular downstream resource available for allocation; and wherein to allocate two or more of the plurality of downstream resources to the respective instruction, the select unit is configured to allocate the particular downstream resource indicated by the value returned by the search result.

19. The system of claim 16, wherein the select unit is further configured to:

deallocate a plurality of downstream resources allocated to the one of the plurality of threads in a single execution cycle;

wherein to update the data structure to indicate that the at least one of the plurality of downstream resources has been deallocated, the select unit is configured to update a respective data structure element associated with each of the deallocated downstream resources; and wherein at least one of the respective data structure elements associated with the deallocated downstream resources is not adjacent to any other ones of the respective data structure elements associated with the deallocated downstream resources.

\* \* \* \* \*